US010509487B2

(12) United States Patent
Dearman et al.

(10) Patent No.: US 10,509,487 B2
(45) Date of Patent: Dec. 17, 2019

(54) COMBINING GYROMOUSE INPUT AND TOUCH INPUT FOR NAVIGATION IN AN AUGMENTED AND/OR VIRTUAL REALITY ENVIRONMENT

(71) Applicant: Google Inc., Mountain View, CA (US)

(72) Inventors: David Dearman, Mountain View, CA (US); Chun Yat Frank Li, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 174 days.

(21) Appl. No.: 15/379,770

(22) Filed: Dec. 15, 2016

(65) Prior Publication Data

US 2017/0329419 A1  Nov. 16, 2017

Related U.S. Application Data

(60) Provisional application No. 62/334,786, filed on May 11, 2016.

(51) Int. Cl.
| | |
|---|---|
| *G06F 3/0488* | (2013.01) |
| *G06F 3/0485* | (2013.01) |
| *G06F 3/0346* | (2013.01) |
| *G06F 3/0484* | (2013.01) |
| *G06T 19/00* | (2011.01) |
| *G06F 1/16* | (2006.01) |

(Continued)

(52) U.S. Cl.
CPC .......... *G06F 3/0346* (2013.01); *G06F 1/1694* (2013.01); *G06F 3/011* (2013.01); *G06F 3/017* (2013.01); *G06F 3/0485* (2013.01); *G06F 3/04842* (2013.01); *G06F 3/04855* (2013.01); *G06F 3/04883* (2013.01); *G06T 19/006* (2013.01); *H04N 21/4126* (2013.01); *G02B 27/017* (2013.01); *G06F 2200/1637* (2013.01)

(58) Field of Classification Search
CPC combination set(s) only.
See application file for complete search history.

(56) References Cited

U.S. PATENT DOCUMENTS

2011/0157046 A1*  6/2011  Lee ........................ G04G 21/08
                                                            345/173
2013/0326364 A1   12/2013  Latta et al.
(Continued)

OTHER PUBLICATIONS

International Search Report and Written Opinion for PCT Application No. PCT/US2016/67119, dated Mar. 21, 2017, 12 pages.
(Continued)

*Primary Examiner* — Rayeez R Chowdhury
(74) *Attorney, Agent, or Firm* — Brake Hughes Bellerman LLP

(57) ABSTRACT

A system for combining a gyromouse input with a touch surface input in an augmented reality (AR) environment and/or a virtual reality (VR) environment, a virtual display of virtual items and/or features may be adjusted in response to movement of the gyromouse combined with touch inputs, or touch and drag inputs, received on a touch surface of the gyromouse. Use of the gyromouse in the AR/VR environment may allow touch screen capabilities to be accurately projected into a three dimensional virtual space, providing a controller having improved functionality and utility in the AR/VR environment, and enhancing the user's experience.

19 Claims, 16 Drawing Sheets

(51) Int. Cl.
  *G06F 3/01* (2006.01)
  *H04N 21/41* (2011.01)
  *G02B 27/01* (2006.01)

(56) References Cited

U.S. PATENT DOCUMENTS

| | | | | |
|---|---|---|---|---|
| 2013/0328805 A1* | 12/2013 | Kim | ........................ | G06F 3/046 |
| | | | | 345/173 |
| 2014/0145955 A1* | 5/2014 | Gomez | ................. | G06F 3/0317 |
| | | | | 345/163 |
| 2014/0347329 A1* | 11/2014 | Ware | ..................... | G06F 3/0383 |
| | | | | 345/179 |
| 2014/0364209 A1* | 12/2014 | Perry | ...................... | G06F 3/013 |
| | | | | 463/31 |
| 2016/0085403 A1* | 3/2016 | Koga | .................... | G06F 3/0485 |
| | | | | 345/684 |
| 2016/0109937 A1* | 4/2016 | Kim | ........................ | G06F 1/163 |
| | | | | 345/156 |

OTHER PUBLICATIONS

Communication pursuant to Article 94(3) EPC for European Application No. 16829453.6, dated Aug. 1, 2019, 10 pages.
Olives, "AirMouse Demo", Youtube, XP054979547, retrieved on Jul. 26, 2019 from https://www.youtube.com/watch?v=64o4--u3ZOk, Apr. 27, 2012, 1 page.

* cited by examiner

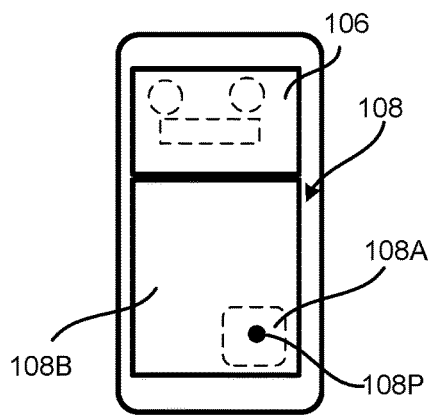
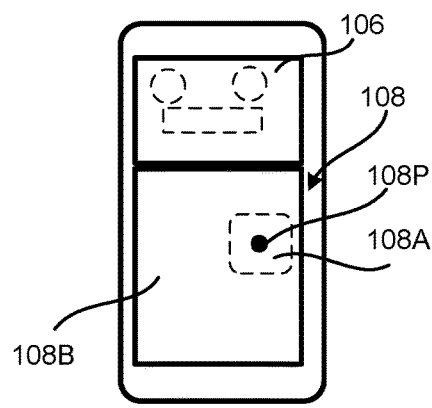
FIG. 6A    FIG. 6B
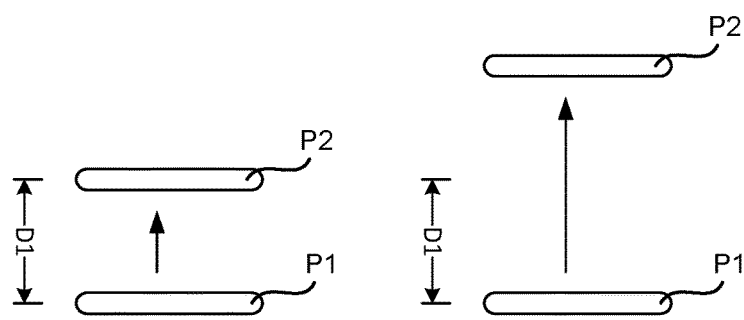
FIG. 6C    FIG. 6D

COMBINING GYROMOUSE INPUT AND TOUCH INPUT FOR NAVIGATION IN AN AUGMENTED AND/OR VIRTUAL REALITY ENVIRONMENT

CROSS REFERENCE TO RELATED APPLICATION(S)

This application is a Non-Provisional of, and claims priority to, U.S. Provisional Application No. 62/334,786, filed on May 11, 2016, which is incorporated by reference herein in its entirety.

FIELD

This document relates, generally, to the processing of inputs in an augmented reality and/or a virtual reality environment.

BACKGROUND

An augmented reality (AR) and/or a virtual reality (VR) system may generate a three-dimensional (3D) immersive environment. A user may experience the augmented and/or virtual environment through interaction with various electronic devices, such as, for example, a helmet or other head mounted device including a display, glasses or goggles that a user looks through when viewing a display device, gloves fitted with sensors, external handheld devices that include sensors, and other such electronic devices. Once immersed in the augmented and/or virtual environment, the user may interact in the virtual environment in different ways for selection and/or manipulation of virtual objects and other such interactions in the virtual environment. For example, the user may provide input through manipulation of an external electronic device, eye gaze, physical movement and/or gestures, and the like to interact with, personalize and control the virtual environment.

SUMMARY

In one aspect, a method may include generating, in a head mounted display device operating in an ambient environment, a virtual environment; setting an anchor point in a virtual display of a virtual object displayed in the virtual environment in response to a selection input received from a controller that is operably coupled to the head mounted display device; receiving, from the controller, a first input implementing a first input mode; adjusting an arrangement of a plurality of virtual features associated with the virtual display of the virtual object in response to the first input, a virtual display area of the virtual display being less than a display area needed to display all of the plurality of virtual features simultaneously; receiving, from the controller, a second input implementing a second input mode, the second input mode being different than the first input mode; and determining whether to ignore the second input or to execute an action in the virtual environment in response to the second input based on a set of previously defined rules.

In another aspect, a computing device may include a memory storing executable instructions, and a processor configured to execute the instructions. The instructions may cause the computing device to: display a virtual environment on a display of a head mounted electronic device worn by a user and operating in an ambient environment; set an anchor point in a virtual display of a virtual object displayed in the virtual environment in response to detecting selection input received from a controller that is operably coupled to the head mounted electronic device; receive, from the controller, a first input implementing a first input mode; adjust an arrangement of a plurality of virtual features associated with the virtual display of the virtual object in response to the first input, a virtual display area of the virtual display being less than a display area needed to display all of the plurality of virtual features simultaneously; receive, from the controller, a second input implementing a second input mode, the second input mode being different than the first input mode; and determining whether to ignore the second input or to execute an action in the virtual environment in response to the second input based on a set of previously defined rules.

The details of one or more implementations are set forth in the accompanying drawings and the description below. Other features will be apparent from the description and drawings, and from the claims.

BRIEF DESCRIPTION OF THE DRAWINGS

FIGS. 2A-2C, 3A-3C, 4A-4C, 5A-5H and 6A-6D illustrate example implementations of use of a gyromouse controller combined with a touch surface input in an augmented reality and/or virtual reality environment, in accordance with implementations described herein.

DETAILED DESCRIPTION

A user immersed in a virtual environment wearing, for example, a head mounted display (HMD) device may explore the virtual environment and interact with the virtual environment through various different types of inputs including, for example, manipulation of an electronic device separate from the HMD and/or manipulation of the HMD itself, and/or eye and/or head directional gaze, and/or head movement and/or hand/arm gestures, and the like. The user may manipulate a handheld electronic device, or controller, together with the HMD, to cause a desired action in the virtual environment. In particular, in some situations, a user may manipulate a controller in a variety of different ways, such as, for example touch inputs to a touch surface of the controller, manipulation of input buttons and/or switches on the controller, physical movement of the controller itself, and the like, to provide input to be implemented in the virtual environment. This capability may provide flexibility and convenience in providing user input, and may enhance the user's virtual experience, particularly in instances in which a visual size of the content to be displayed to the user in the virtual environment exceeds the area that can be viewed by the user. In some instances, these multiple input modes available using the same controller, such as, for example, a gyromouse, may generate some ambiguity and/or unintended user inputs when a user, for example, inadvertently moves or gestures with the controller while inputting a touch input on the touch surface of the controller, inadvertently moves a touch on the touch surface while making an input via a physical movement or gesture of the controller, and the like.

In a system and method, in accordance with implementations described herein, a set of predefined rules, or an algorithm, may be applied to inputs received via a controller. These predefined rules or algorithm may allow a user's intended input to be more accurately determined, and a user's intended interaction in the virtual environment may be accurately implemented by the system. A system and method, in accordance with implementations described herein, may also allow for user manipulation of a virtual display of virtual objects, features, options and the like when the virtual objects, features, options and the like exceed or fall outside of the available virtual display area by, for example, scrolling, zooming in and out, and the like, using, for example a controller having a touch input surface, and also having the capability to provide position and orientation information of the controller relative to the virtual display.

Figure 1:
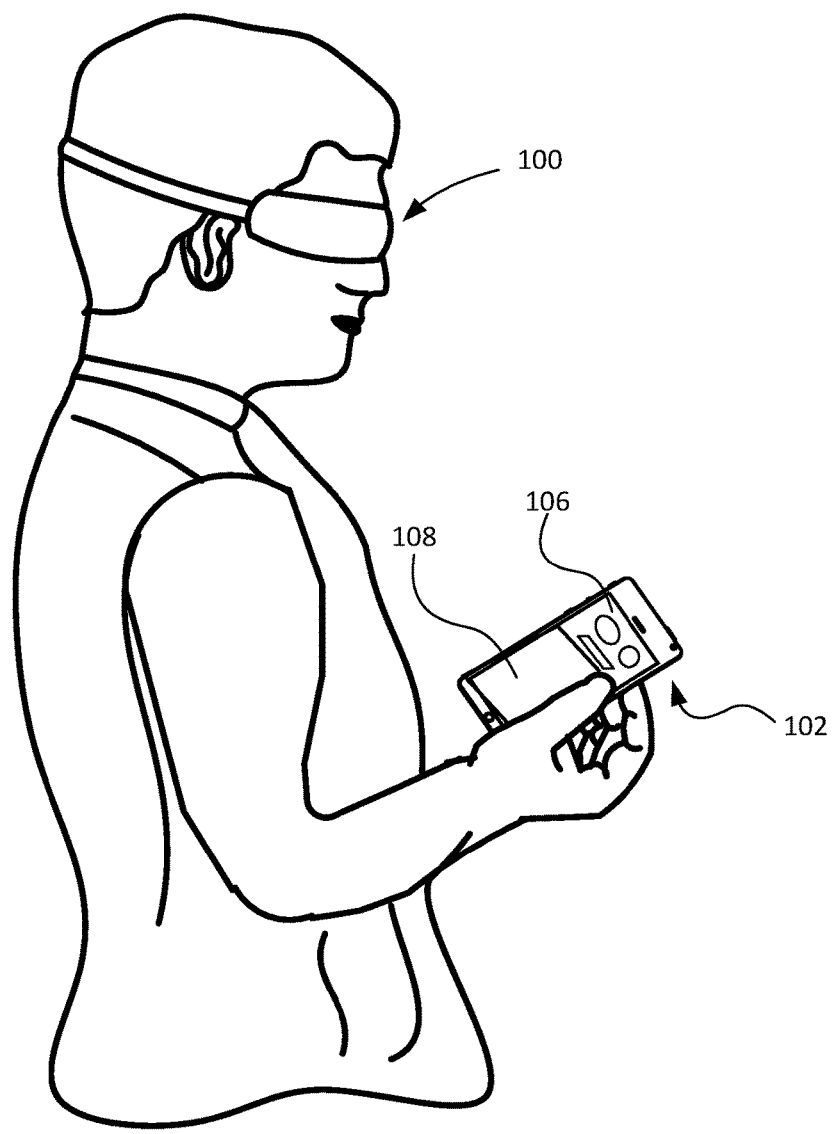
FIG. 1 is an example implementation of a virtual reality system including a head mounted display and a handheld electronic device, in accordance with implementations as described herein.

In the example implementation shown in FIG. 1, a user wearing an HMD 100 is holding a portable handheld electronic device 102. The portable handheld electronic device 102 may be, for example, a gyromouse, a smartphone, or other type of controller that may be paired with, and communicate with, the HMD 100 for interaction in the immersive virtual experience generated by the HMD 100. In some implementations, a six degree of freedom (6DOF) position and orientation of the handheld electronic device 102 may be tracked based on various sensors included in the device 102, such as, for example, an inertial measurement unit including, for example, an accelerometer, a gyroscope, a magnetometer, and the like as in a gyromouse, or a smartphone adapted in this manner. In some implementations, a 6DOF position and orientation of the handheld electronic device 102 may be tracked based on a position of the device 102 detected by other sensors in the system, such as, for example image sensors included on the HMD 100, together with orientation sensors included in the device 102. The handheld electronic device 102 may be operably coupled with, or paired with the HMD 100 via, for example, a wired connection, or a wireless connection such as, for example, a wifi or Bluetooth connection, to provide for the exchange of data and communication between the device 102 and the HMD 100, allowing the handheld electronic device 102 to function as a controller. That is, a manipulation of the handheld electronic device 102, such as for example an input received on a touch surface of the handheld electronic device 102, or a physical movement of the handheld electronic device 102, or a virtual ray or beam virtually emitted from the handheld electronic device 102 as directed by the user, may be translated into a corresponding interaction, or movement, in the virtual environment. Hereinafter, the handheld electronic device will be referred to as a controller 102, simply for ease of discussion.

As noted above, in some implementations, the controller 102 may be a gyromouse, which may be operable in free space to, for example, select, manipulate and in other manners interact with objects in the virtual environment. Use of a controller 102 including gyromouse capability may essentially allow for relatively accurate projection of touchscreen input capabilities of a mobile device into a three dimensional (3D) space.

The gyromouse may include, for example, a gyroscope that generates a signal indicating angular movement of the gyromouse that can be translated into directional movement in the virtual environment. In some implementations, the gyromouse may also include an accelerometer that generates a signal indicating acceleration of the gyromouse, for example, acceleration in a direction corresponding to the directional signal generated by the gyroscope. In some implementations, the gyromouse may also include a magnetometer that generates a signal indicating relative position of the gyromouse in the real world space based on the strength and/or direction of a detected magnetic field. The detected three dimensional position of the gyromouse in the real world space, together with orientation information related to the gyromouse provided by the gyroscope and/or accelerometer and/or magnetometer, may provide for 6DOF tracking of the gyromouse, so that user manipulation of the gyromouse may be translated into an intended interaction in the virtual environment and/or directed to an intended virtual target in the virtual environment. In some implementations, the controller 102 may be another type of portable electronic device such as, for example, a smartphone or other portable handheld device equipped with these types of sensors, so that a position and an orientation of the controller 102 may be tracked, and user manipulation of the controller 102 may be translated into an intended interaction in the virtual environment and/or directed to an intended virtual target in the virtual environment.

In some implementations, the controller 102 (i.e., a gyromouse, a smartphone, other type of portable electronic device equipped with sensors and the like) may include manipulation devices configured to receive various different types of user inputs. For example, the controller 102 may include a touch surface 108 configured to receive, for example, a touch input, a touch and drag input, a pinch and zoom input and the like. The controller 102 may also include other manipulation devices 106, such as, for example, one or more buttons, one or more toggle switches, one or more joysticks, and the like, configured to receive user inputs.

A controller 102 equipped in this manner may receive user inputs in a variety of different input modes to be translated into corresponding interactions in the virtual environment. These user input modes may include, for example, a physical movement or gesture of the controller 102 detected by the sensors included in the controller 102, a touch input (including touch and drag, pinch and zoom and the like) detected by the touch surface of the controller 102, a selection received at one of the manipulation devices 106 of the controller 102, and other such inputs. In some implementations, the controller 102 may receive a user command including a combination of these modes, or a sequential application of these modes.

Figure 2A:
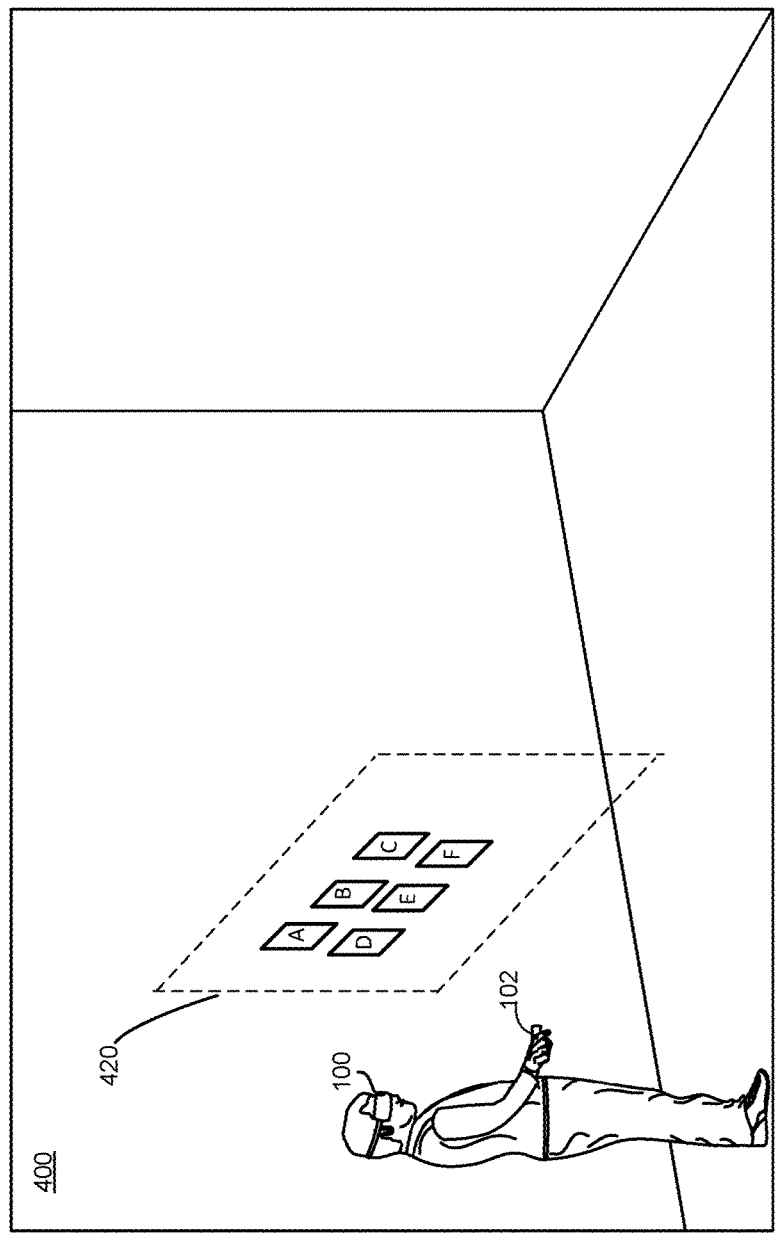

An example implementation of a system for combining movement input and touch input in an augmented reality and/or a virtual reality environment using a controller 102 including, for example, gyromouse capabilities, is shown in FIG. 2A. FIG. 2A is a third person view of a user in a physical space, wearing an HMD 100 and holding a controller 102, while viewing a virtual display 420 generated by the HMD 100, the virtual display 420 displaying a plurality of virtual objects A, B, C, D, E and F. The virtual display 420 may be viewed by the user in the HMD 100, for example, on a display in the HMD 100. However, simply for ease of discussion and illustration, the virtual display 420 will be illustrated outside of the HMD 100 in the following example implementations. The user may choose to select one of the virtual objects A-F for interaction and/or manipulation and the like in numerous different manners such as, for example, directing the controller 102 toward the virtual object to be selected, illustrated by a virtual beam or ray 450 directed from the controller 102 toward the virtual object to be selected to provide a visual indication of the direction of the controller 102, directing a head gaze and/or eye gaze at the virtual object to be selected, using the touch surface 108 of the controller 102 to navigate a virtual cursor to the virtual object to be selected, and the like.

Figure 2B:
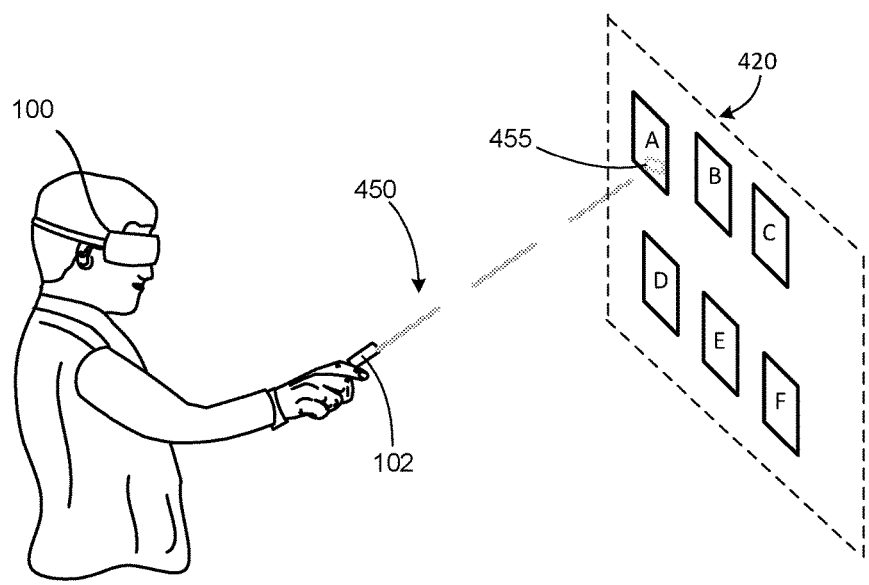

In the example shown in FIG. 2B (which is also a third person view of the user in the physical space, experiencing the virtual environment 400 generated by the HMD 100, with the virtual display 420 illustrated outside of the HMD 100 for ease of explanation), the user directs a virtual ray 450 from the controller 102 toward the virtual object A by, for example, manipulating the touch surface 108 and/or another manipulation device 106 of the controller 102. In this example, the controller 102 may be equipped with gyromouse type capabilities as discussed above, and/or may be otherwise equipped so that a 6DOF position and orientation of the controller 102 may be detected and tracked. As this 6DOF tracking may allow the system to detect and track position and orientation of the controller 102, the system may process the detected position and orientation to determine a point of intersection of the virtual ray 450 with a virtual object to be selected based on the direction of the controller 102. As, in some situations, the virtual ray 450 may not actually be visible to the user, in some implementations, a virtual indicator 455, such as a virtual cursor 455 or other type of visual indicator, may be displayed to the user to provide a visual indicator to the user of the point of intersection of the directional ray of the controller 102 and a corresponding virtual object, prior to actual selection of the virtual object. The user may then select, for example, the virtual object A, by manipulating the controller 102, such as, for example, releasing the touch from the touch surface 108, releasing the depression of one of the manipulation devices 106, and the like.

Figure 2C:
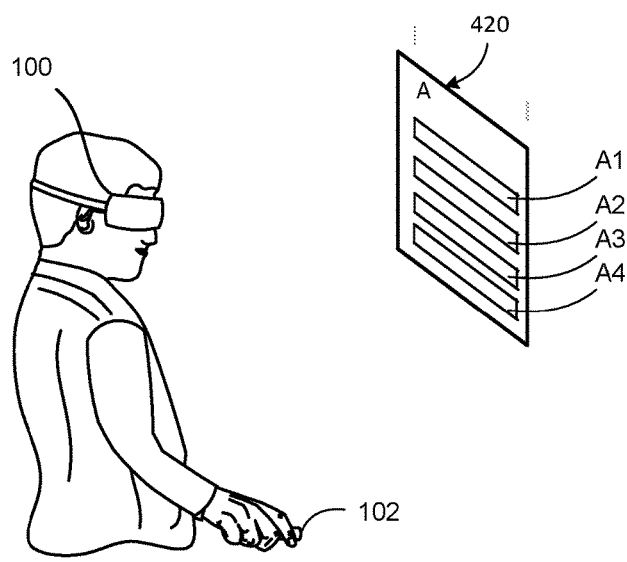

A number of different virtual objects, features, options and the like may be available in association with the virtual objects A-F. For example, a number n of different virtual objects, features, and the like may be available in association with the virtual object A. However, it may not be possible to view all of the virtual objects, features and the like, for example, features A1 through An, all at the same time within the area of the virtual display 420 visible to the user due to, for example, the size of the virtual display area, the size of the virtual features A1-An, and other such factors. In response to the selection of the virtual object A, the system may enlarge and display additional features A1, A2, A3 and A4, content and the like related to the virtual object A in the virtual display 420, for interaction with and/or manipulation by the user, as shown in FIG. 2C. As some of the features, content and the like in addition to the features A1-A4 displayed to the user, may exceed the area available for viewing by the user, the user may choose to scroll, navigate or otherwise move through the features, for example, to locate a desired feature, to view the features available for making a selection and the like.

Figure 3A:
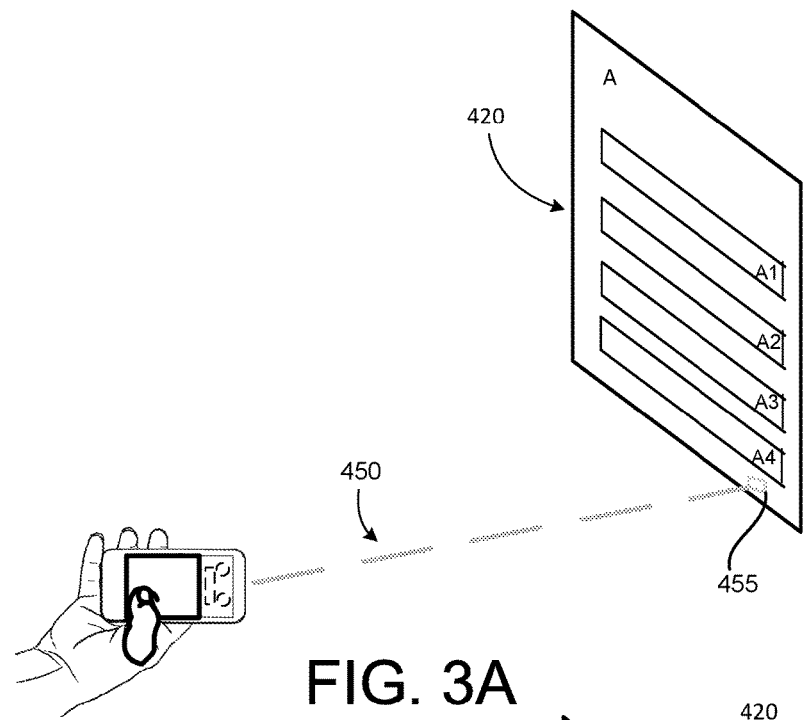
Figure 3B:
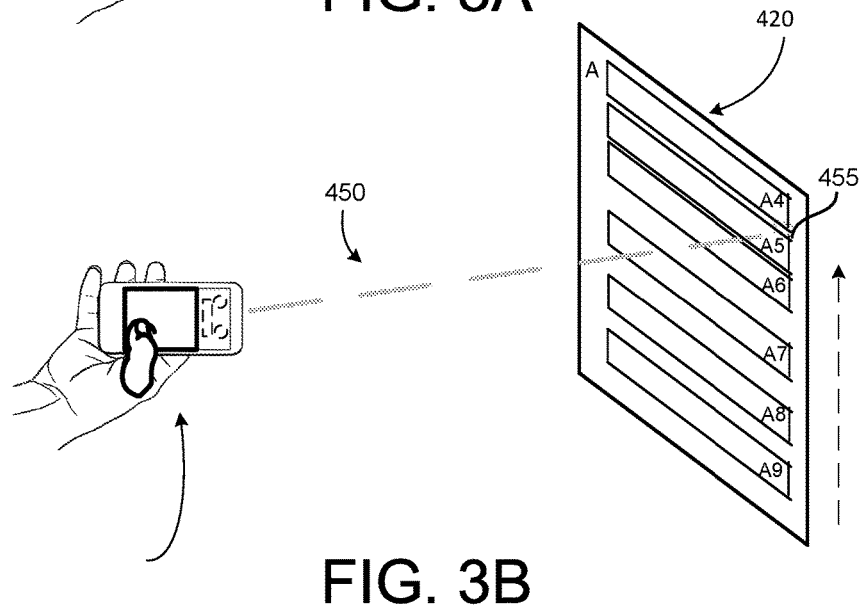
Figure 3C:
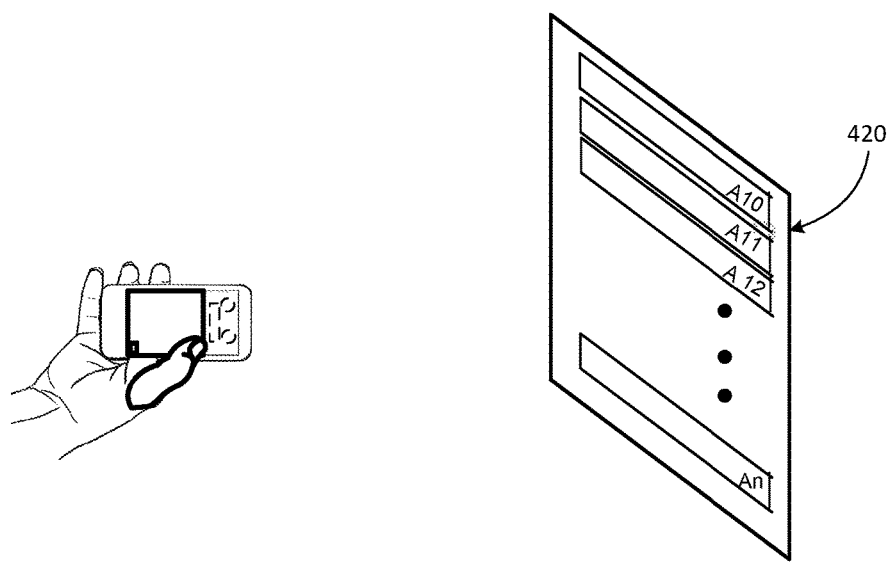

In some implementations, the user may cause movement of the features A1-An available in association with the selected virtual object A by, for example, pointing at the virtual display 420 to select and/or set an anchor point in a particular portion of the display area, and then implementing a physical movement of the controller 102, for example, a downward movement to cause the display of features to scroll downward or an upward movement to cause the display of features to scroll upward, and the like, as shown in FIGS. 3A-3C. FIGS. 3A-3C provide a third person view of the user (specifically, the user's hand, holding the controller 102) in the physical space, interacting with virtual content displayed in the virtual environment generated by the HMD 100.

The user may direct a virtual beam 450 at a portion of the virtual display 420 of the selected virtual object A, for example, a bottom portion of the display of the virtual object A, as shown in FIG. 3A. This selection input may, essentially, set an anchor point at the portion of the virtual display 420 at which the virtual beam 450 intersects a particular virtual object by, for example, a touch applied to the touch surface 108 of the controller 102, manipulation of one of the other manipulation devices 106, and the like. Simply for ease of discussion and illustration, hereinafter, this intersection point of the virtual beam 450 with a particular portion of the virtual display 420 will be referred to as the endpoint 455 of the virtual beam 450. This anchor point may define a point from which the user may, for example, virtually grasp and hold a corresponding portion of the virtual display 420 for movement, manipulation, selection and the like. The user may then implement, or carry out, or execute, or perform a physical upward movement of the controller 102, as shown in FIG. 3B, to cause the list of features A1-An associated with the selected virtual object A to scroll upwards. This upward movement may be sustained until, for example, the physical movement is terminated or changes direction, the touch on the touch surface 108 or depression of the manipulation device 106 is released, and the like, as shown in FIG. 3C. Downward movement of the features A1-An associated with the selected virtual object A may be implemented by, for example, directing the virtual beam 450 at an upper portion of the display area, setting the anchor point as described above, followed by a downward movement of the controller in a similar manner. Other movement, including scrolling, may be achieved in various other directions, such as in the left direction, the right direction, diagonal directions and the like in a similar manner.

In some instances, the user may, for example, inadvertently or unintentionally move the controller 102 while intentionally inputting a touch input on the touch surface 108 of the controller 102. Similarly, in some instances, the user may, for example, inadvertently or unintentionally move or drag along the touch surface 108 of the controller 102 while intentionally implementing a physical movement of the controller 102. To ensure that the system reacts to intentional user inputs, and does not react to unintentional user inputs, in some implementations, a set of pre-defined rules for responding to the various different types of inputs may be implemented by the system to facilitate the accurate selection of a particular virtual object or virtual feature and/or action to be taken in the virtual environment based on the detected inputs and the set of rules for operation. In some implementations, the rules for operation, and response to detected inputs, may be applied to any detected input. In some implementations, the rules for operation, and response to detected inputs, may be applied when a secondary input is detected while a primary input is activated. The rules for operation, and response to detected inputs may be based on, for example, user preferences, a type of controller in use, a particular virtual environment and associated context, a particular set of virtual objects, features and the like currently available for manipulation by the user, and the like. The rules for operation may allow the system to assess the likelihood, or probability, that a detected user input was intentional, and to process the input accordingly. In other words, the application of the rules to detected user inputs allows the system to categorize inputs. The inputs may be categorized as, for example, intended input, and unintended input hereinafter. Based on this categorization, unintended input can be filtered out, i.e. ignored, so that the number of inputs that the system is responsive to can be reduced to intended inputs. In that way, imprecision in the user's input may be filtered out, thus improving the accuracy of the user's interaction with the system, for example in the sense that only inputs related a current input mode and/or related to interaction with a specific virtual target in the virtual environment are processed, while other inputs are filtered out.

In the example shown in FIGS. 3A-3C, the selection input sets the anchor point in the virtual display area at the end 455 of the virtual ray 450 in response to a touch input on the touch surface 108 of the controller 102, and scrolling of the features A1-An is implemented by the system in response to physical movement of the controller 102. If, during the physical movement of the controller 102 shown in FIG. 3B, the user were to inadvertently apply an unintended touch/drag on the touch surface 108 of the controller 102, the system may ignore the detected touch/drag on the touch surface 108, based on the set of rules established for this set of inputs. For example, in some implementations, the system may ignore the detected touch/drag on the touch surface 108 if the touch/drag remains within a pre-defined area 108A of the touch surface 108 as shown in FIG. 6A, if a magnitude of the touch/drag input is less than a pre-defined threshold, and the like, indicating the touch/drag input was unintentional. In some implementations, if the system detects that the touch/drag has moved into an area 108B of the touch surface 108 outside of the pre-defined area 108A, the system may determine that the touch/drag input was intentional. In some implementations, the pre-defined area 108A on the touch surface 108 may be based on, for example, a set area surrounding an initial touch point 108P on the touch surface 108 associated with the input. That is, if the initial touch point 108P on the touch surface 108 is located as shown in FIG. 6B, rather than as shown in FIG. 6A, the pre-defined area 108A may be based on the location of the initial touch point 108P.

Figure 4A:
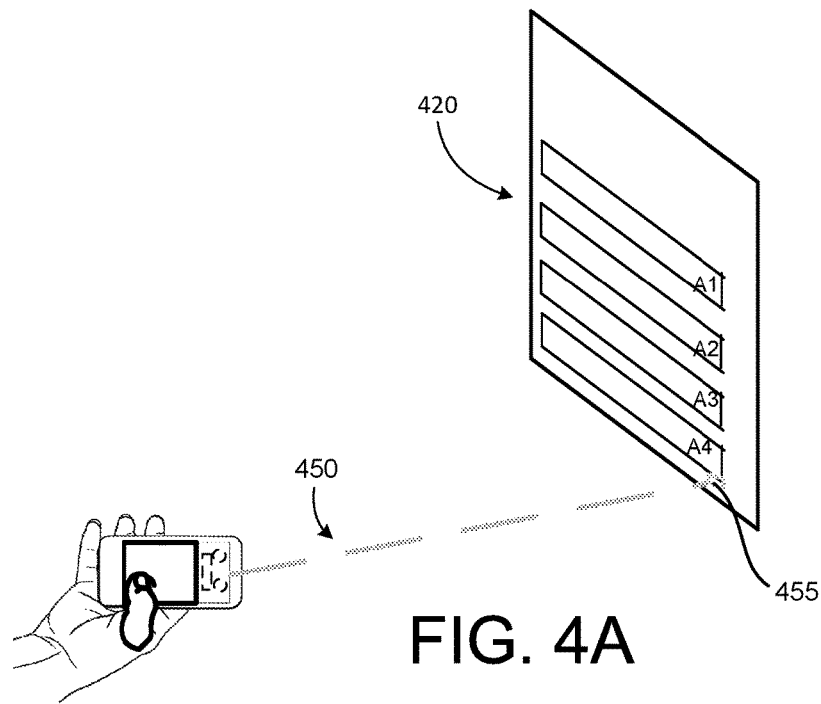
Figure 4B:
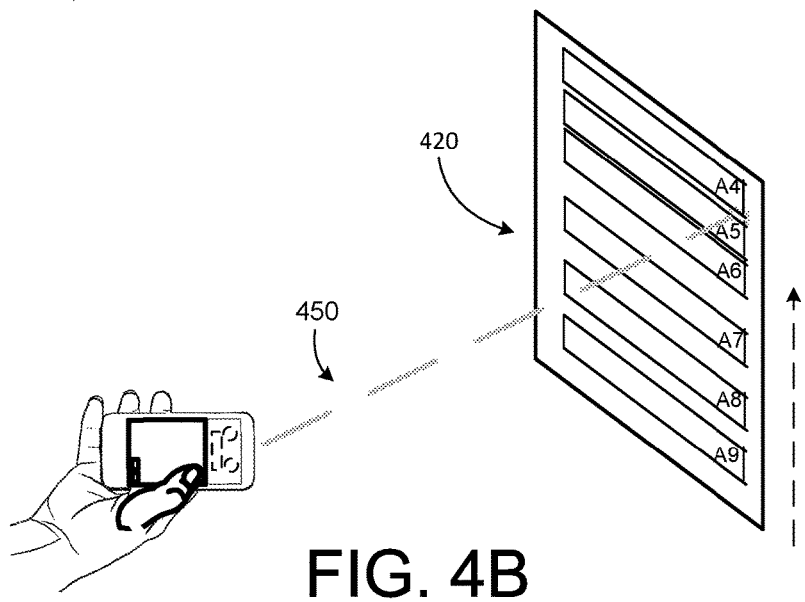
Figure 4C:
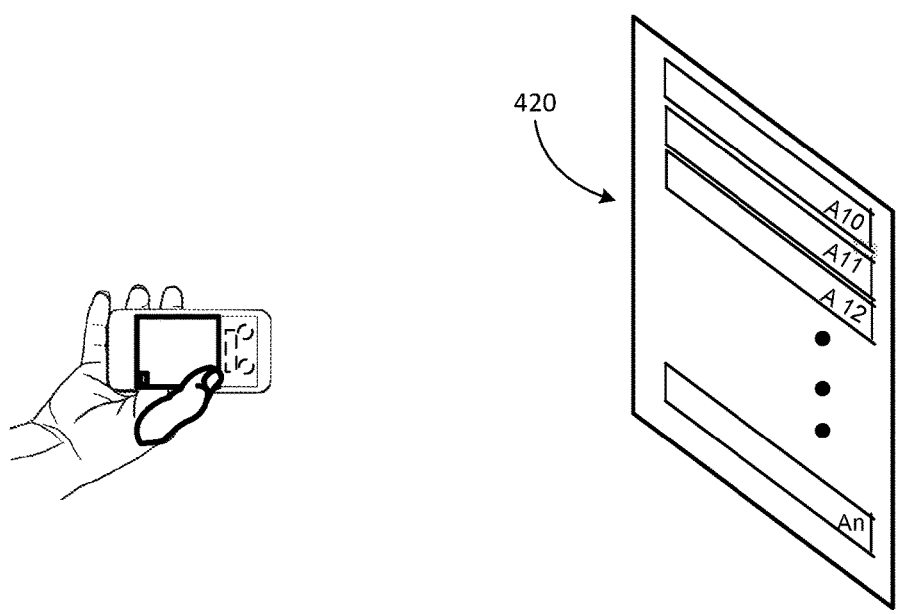

In some implementations, the user may cause movement of the features A1-An available in association with the selected virtual object A by, for example, inputting a selection input by pointing at the display area 420 to set an anchor point, and then implementing a touch and drag input on the touch surface 108 of the controller 102, for example, an upward drag on the touch surface 108 to cause the display of features to scroll upward, a downward drag on the touch surface 108 to cause the display of features to scroll downward, and the like, as shown in FIGS. 4A-4C. FIGS. 4A-4C provide a third person view of the user (specifically, the user's hand, holding the controller 102) in the physical space, interacting with virtual content in the virtual environment generated by the HMD 100.

The user may direct a virtual beam 450 at a portion of the virtual display 420 of the selected virtual object A, for example, a bottom portion of the display of the virtual object A, as shown in FIG. 4A. This may, essentially, set an anchor point at the portion of the display at which the virtual beam 450 intersects the portion of the virtual display 420 by, for example, a touch applied to the touch surface of the controller 108, manipulation of one of the other manipulation devices 106, and the like. As noted above, in this example, the end 455 of the virtual beam 450 shown in FIGS. 4A-4C illustrates the intersection of the virtual beam 450 with the virtual display 420. The user may then input a drag movement along the touch surface 108 of the controller 102, as shown in FIG. 4B, to cause the list of features A1-An associated with the selected virtual object A to scroll upwards. This upward movement may be sustained until, for example, the drag input is terminated or changes direction, the touch on the touch surface 108 or depression of the manipulation device 106 is released, and the like, as shown in FIG. 4C. Downward movement of the features A1-An associated with the selected virtual object A may be implemented by, for example, directing the virtual beam 450 at an upper portion of the virtual display 420 and setting the anchor point as described above, and implementing a downward drag input on the touch surface 108 of the controller 102 in a similar manner. Other movement, including scrolling, may be achieved in various other directions, such as in the left direction, the right direction, diagonal directions and the like in a similar manner.

As noted above, in some instances, the user may, for example, inadvertently or unintentionally move the controller 102 while intentionally inputting a touch input on the touch surface 108 of the controller 102. If, during the input of the touch and drag input on the touch surface 108 of the controller 102 shown in FIG. 4B, the user were to inadvertently cause a physical movement or gesture with the controller 102, the system may ignore the detected physical movement of the controller 102, based on a set of pre-defined rules for responding to the various different types of inputs, so that only the intended user inputs cause corresponding actions in the virtual environment. For example, in some implementations, the system may ignore a detected physical movement of the controller 102 if, for example, a magnitude or direction of the detected physical movement of the controller 102, from a position P1 to a position P2, is less than a pre-defined threshold D1 or within a predefined range D1, as shown in FIG. 6C, indicating the physical movement of the controller 102 was unintentional. In some implementations, if the system detects that the magnitude of the physical movement of the controller 102, from the position P1 to the position P2, exceeds the pre-defined range D1, as shown in FIG. 6D, the system may determine that the physical movement of the controller 102 was intentional.

In some implementations, the user may cause movement of the features A1-An available in association with the selected virtual object A by, for example, manipulating a virtual vertical scroll bar 460 and/or a virtual horizontal scroll bar 470 displayed in the display area of the virtual display 420, as shown in FIGS. 5A-5G. FIGS. 5A-5F provide a third person view of the user (specifically, the user's hand, holding the controller 102) in the physical space, interacting with virtual content displayed in the virtual environment generated by the HMD 100.

Figure 5A:
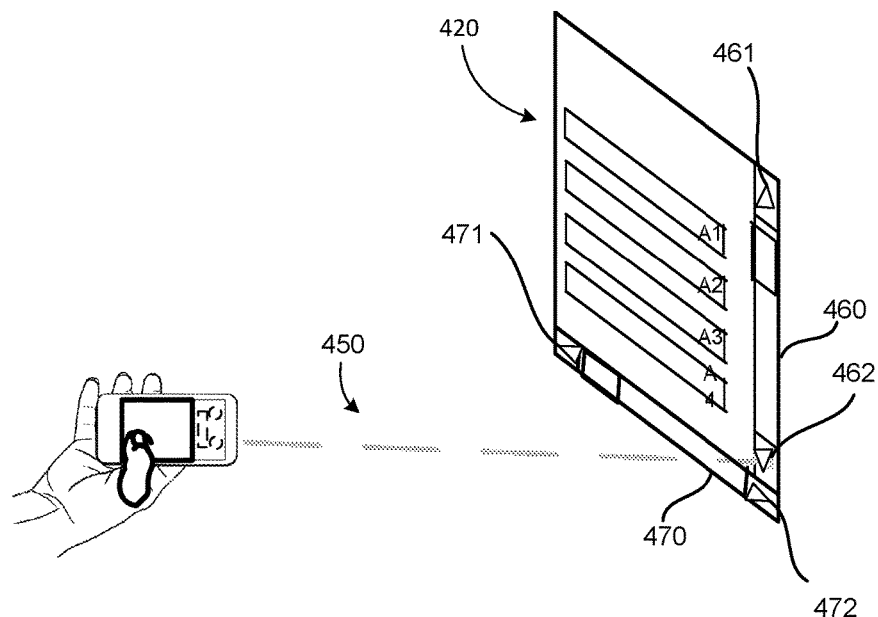
Figure 5B:
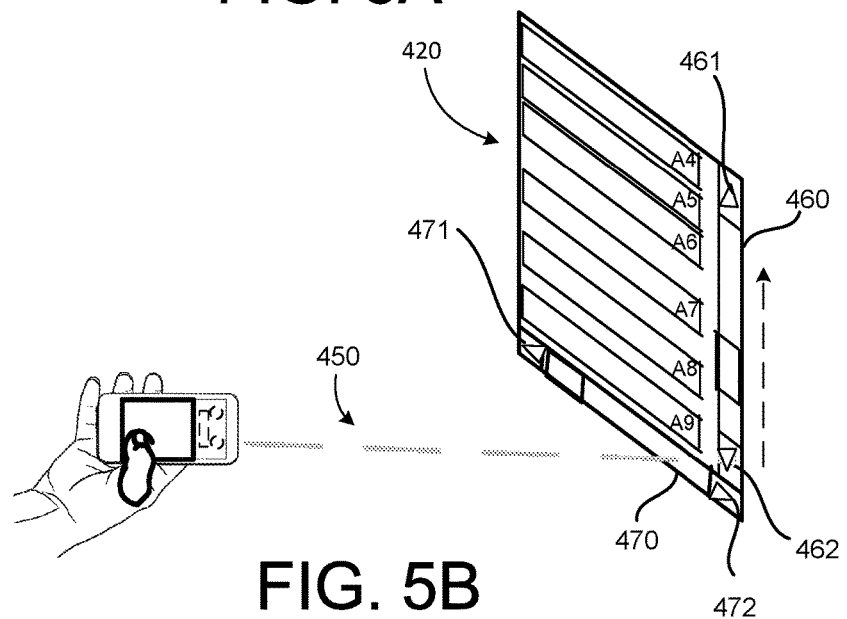
Figure 5C:
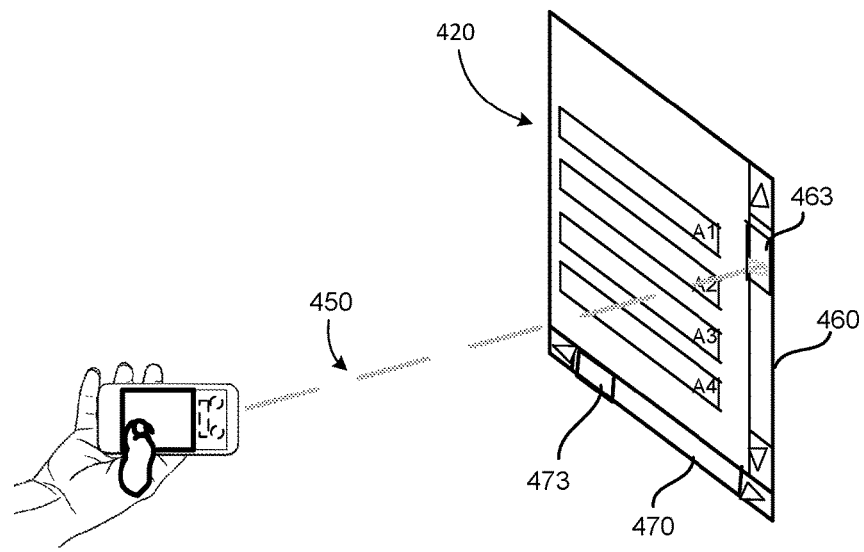

In some implementations, the user may input a selection input by pointing and selecting a virtual up arrow 461, a virtual down arrow 462, a virtual left arrow 471, or a virtual right arrow 472 to generate a corresponding movement of the features A1-An. In the example shown in FIG. 5A, the user directs a virtual beam 450 at a portion of the virtual display 420 of the selected virtual object A, for example, the down arrow 462 in the vertical scroll bar 460, and selects the down arrow 462 for input by, for example, a touch applied to the touch surface 108 of the controller 102, manipulation of one of the other manipulation devices 106, and the like. The user may then virtually select (e.g., virtually click on) the down arrow 462 by, for example, one or more touch inputs applied to the touch surface 108 of the controller 102, one or more depressions of one of the manipulation devices 106 and the like, as shown in FIG. 5B, to cause the list of features A1-An associated with the selected virtual object A to scroll in a corresponding direction. Downward movement of the features A1-An associated with the selected virtual object A may be implemented by, for example, directing the virtual beam 450 at the upper arrow 461 in the vertical scroll bar 460 of the display area and virtually selecting (e.g., virtually clicking on) the up arrow 461 as described above. Movement of the features A1-An associated with the selected virtual object A in other directions, for example, to the left and the right, may be implemented by, for example, directing the virtual beam 450 at the left arrow 471 or the right arrow 472 in the horizontal scroll bar 470 of the display area and virtually selecting (e.g., virtually clicking on) the selected arrow 471/472 as described above to generate movement of the features A1-An in a corresponding direction. A set of pre-defined rules, as discussed above in detail with respect to FIGS. 6A-6D, may be applied to the detection of the various inputs described above with respect to FIGS. 5A-5B, so that the system takes action in response to intended inputs, and does not take action in response to unintended inputs.

Figure 5D:
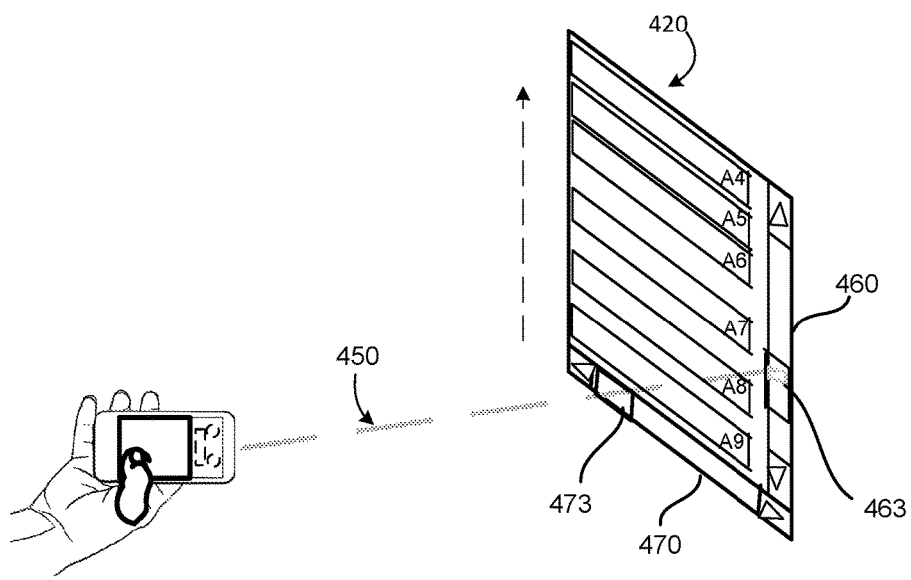
Figure 5E:
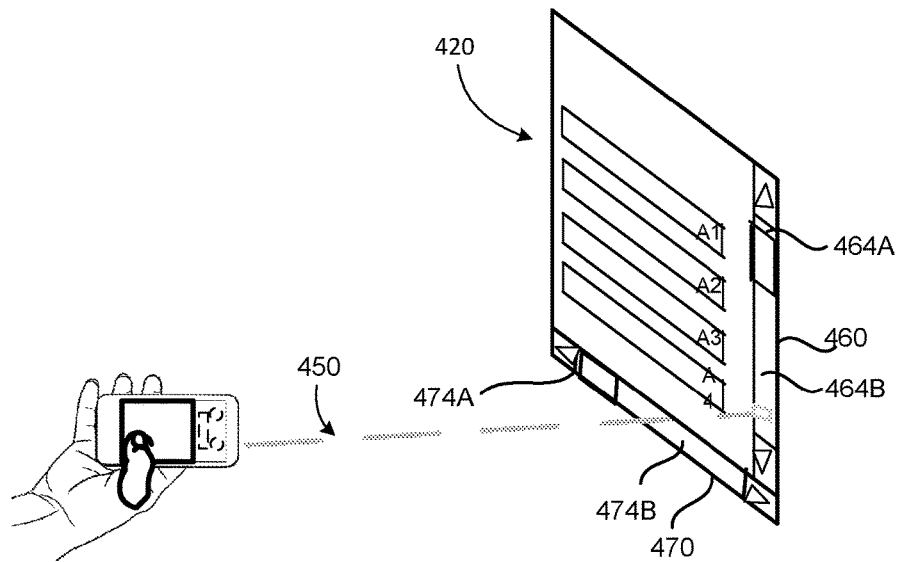

In some implementations, similar movement may be achieved by virtual movement of a virtual vertical indicator 463 in the virtual vertical scroll bar 460 and/or movement of a virtual horizontal indicator 473 in the virtual horizontal scroll bar 470 to generate a corresponding movement of the features A1-An. In this example, the user may set an anchor point at the portion of the virtual display 420 at which the end 455 of the virtual beam 450 is positioned (in this example, on the vertical indicator 463 in the vertical scroll bar 460) by, for example, a touch applied to the touch surface of the controller 108, manipulation of one of the other manipulation devices 106, and the like. As shown in FIG. 5D, the user may then input a drag movement along the touch surface 108 of the controller 102, or perform a physical movement of the controller 102 as described above, to cause the list of features A1-An associated with the selected virtual object A to scroll. This movement may be sustained until, for example, the detected drag input is terminated or changes direction, the detected physical movement of the controller 102 is terminated or changes direction, the detected touch on the touch surface 108 or depression of the manipulation device 106 is released, and the like. Downward movement of the features A1-An associated with the selected virtual object A may be implemented by, for example, directing the virtual beam 450 at the vertical indicator 463 in the vertical scroll bar 460 and implementing a downward drag input on the touch surface 108 of the controller 102, or implementing a downward physical movement of the controller 102, in a similar manner. Movement of the features A1-An associated with the selected virtual object A in other directions, for example, to the left and the right, may be implemented by, for example, directing the virtual beam 450 at the horizontal indicator 473 in the horizontal scroll bar 470 of the display area and implementing a drag input in the left or right direction on the touch surface 108 of the controller 102, or implementing a physical movement of the controller 102 in the left or right direction, in a similar manner to generate movement of the features A1-An in a corresponding direction. A set of pre-defined rules, as discussed above in detail with respect to FIGS. 6A-6D, may be applied to the detection of the various inputs described above with respect to FIGS. 5C-5D, so that the system takes action in response to intended user inputs, and does not take action in response to unintended inputs.

Figure 5F:
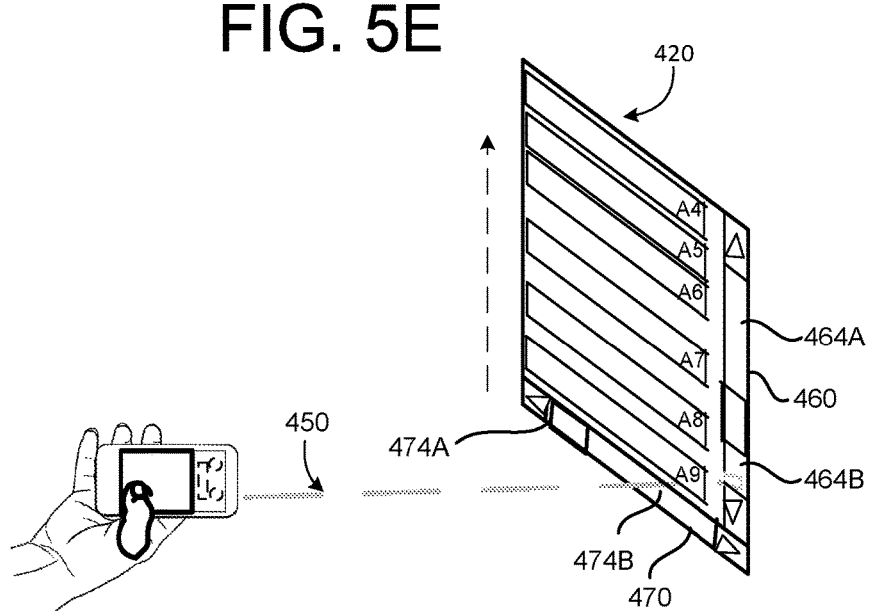

In some implementations, similar movement may be achieved by input(s) applied in areas 464A/464B above or below the virtual vertical indicator 463 and/or input(s) applied in areas 474A/474B to the right or left of the virtual horizontal indicator 473 to generate a corresponding movement of the features A1-An. In the example shown in FIG. 5E, the user directs a virtual beam 450 at a portion of the virtual display 420 of the selected virtual object A, for example, the area 464B in the vertical scroll bar 460, and selects the area 464B for input by, for example, a touch applied to the touch surface 108 of the controller 102, manipulation of one of the other manipulation devices 106, and the like. The user may then virtually select (e.g., virtually click on) the area 464B by, for example, one or more touch inputs applied to the touch surface 108 of the controller 102, one or more depressions of one of the manipulation devices 106 and the like, as shown in FIG. 5F, to cause the list of features A1-An associated with the selected virtual object A to scroll in a corresponding direction. Downward movement of the features A1-An associated with the selected virtual object A may be implemented by, for example, directing the virtual beam 450 at the area 464A in the vertical scroll bar 460 of the display area and virtually selecting (e.g., virtually clicking on) the area 464A as described above. Movement of the features A1-An associated with the selected virtual object A in other directions, for example, to the left and the right, may be implemented by, for example, directing the virtual beam 450 at one of the areas 474A or 474B in the horizontal scroll bar 470 of the display area and virtually selecting (e.g., virtually clicking on) the selected area 474A or 474B as described above to generate movement of the features A1-An in a corresponding direction. A set of pre-defined rules, as discussed above in detail with respect to FIGS. 6A-6D, may be applied to the detection of the various inputs described above with respect to FIGS. 5E-5F, so that the system takes action in response to intended user inputs, and does not take action in response to unintended user inputs.

Figure 5G:
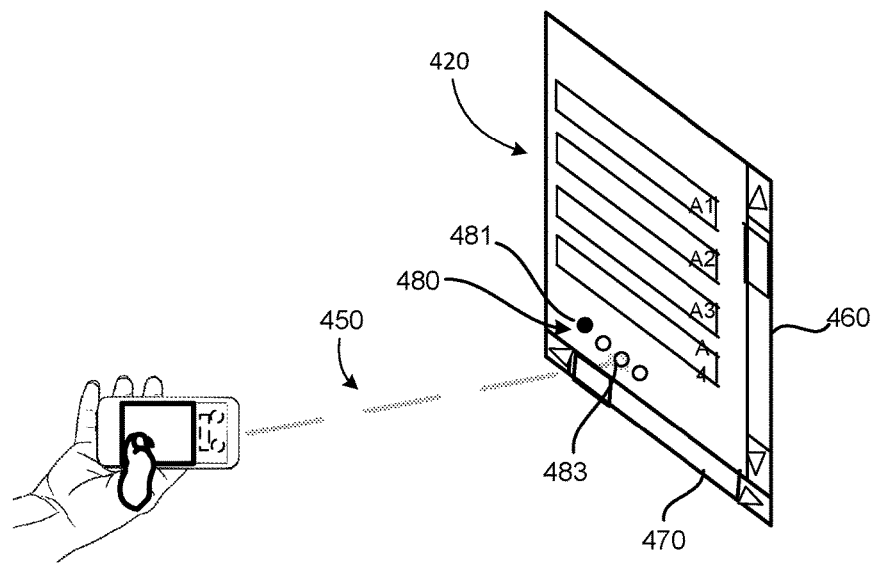

In some implementations, the virtual features displayed within the display area of the virtual display 420 may be adjusted or changed by, for example, skipping ahead (or back), or jumping ahead (or back), rather than scrolling as described above. For example, as shown in FIG. 5G, a virtual content indicator 480 may be displayed to the user. The virtual content indicator 480 may provide a visual indication to the user that virtual features, in addition to the virtual features A1-A4 displayed on the virtual display 420, are available to the user, in associated with the particular virtual object A selected. In the example shown in FIG. 5G, the example virtual content indicator 480 includes a plurality of virtual content buttons, each of the virtual content buttons corresponding to a particular spot, or bookmark, in the list of virtual features A1-An available in association with the selected virtual object A. In this example, virtual features A1-A4 are displayed, and a first virtual content button 481 is highlighted, providing a visual indication to the user that the displayed virtual features A1-An are at essentially the beginning of the list of virtual features A1-An available in association with the selected virtual object A.

Figure 5H:
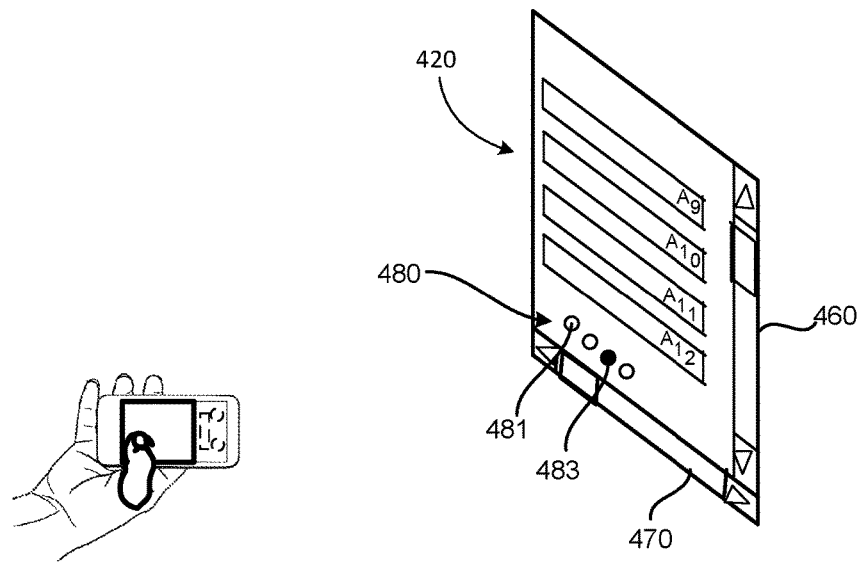

In the example shown in FIG. 5G, to move, or skip, or jump forward in the list of virtual features A1-An, the user may direct the virtual beam 450 toward another of the virtual content buttons in the virtual content indicator 480, such as, for example, a third virtual content button 483, and may select the third virtual content button 483, for example, in the manner described above. This may cause the system to move, or skip, or jump ahead in the list of virtual features A1-An (rather than sequentially scrolling through the list of virtual features A1-An) to a position in the list of virtual features corresponding to the third virtual content button 483, as shown in FIG. 5H. In this example, the third content button 483 is highlighted (and the first content button 481 is no longer highlighted) to provide a visual indication to the user of a position within the list of virtual features A1-An associated with the selected virtual object A, and the virtual features A9-A12 are now displayed to the user on the virtual display 420. The user may move, or skip, or jump back, in the list of virtual features A1-An, in a similar manner. A set of pre-defined rules, as discussed above in detail with respect to FIGS. 6A-6D, may be applied to the detection of the various inputs described above with respect to FIGS. 5G-5H, so that the system takes action in response to intended user inputs, and does not take action in response to unintended user inputs The example systems and methods have been described above with respect to moving and/or scrolling various virtual items and or features included in virtual lists, menus and the like displayed in an augmented and/or virtual reality environment, simply for ease of discussion and illustration. However, similar principles may be applied in navigating situations in which items, features and the like exceed an available space for display, and may also be applied to scaling, zooming in and/or out, volume control and other such features.

Figure 7A:
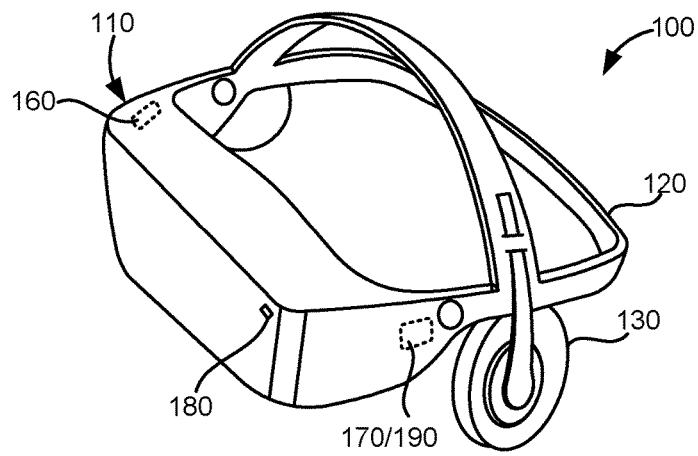
FIGS. 7A and 7B are perspective views of an example head mounted display, in accordance with implementations as described herein.
Figure 7B:
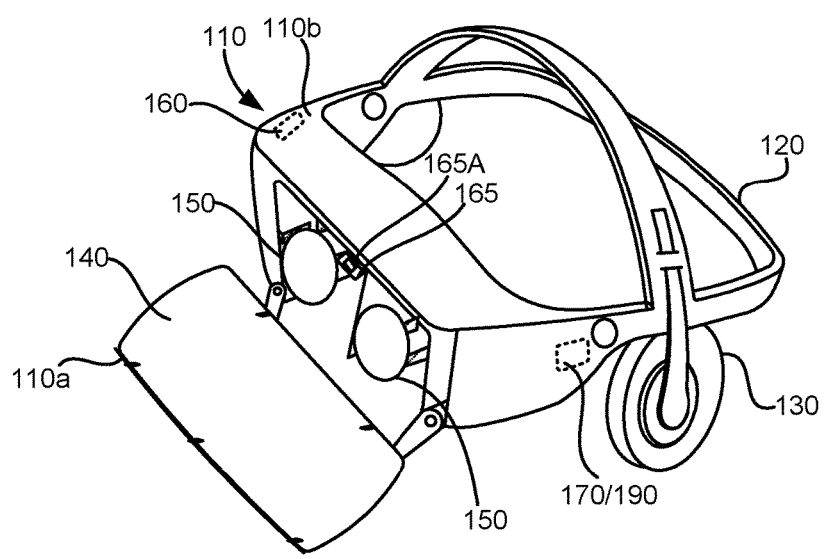
Figure 8:
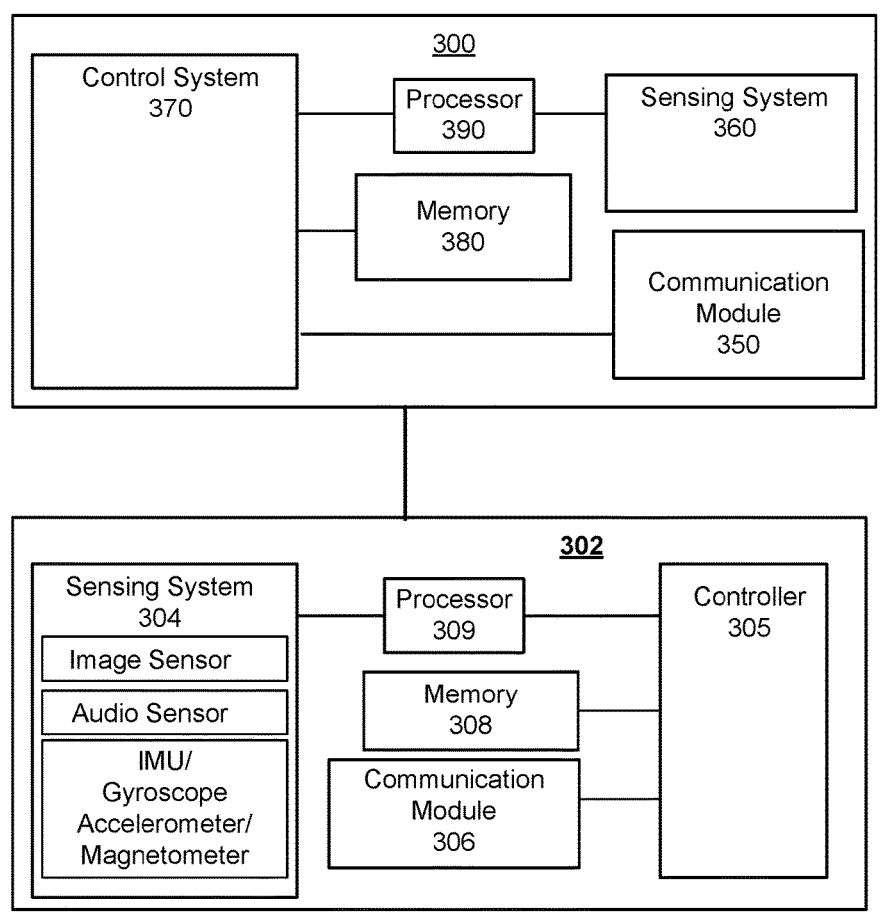
FIG. 8 is a block diagram of a virtual reality system, in accordance with implementations as described herein.

FIGS. 7A and 7B are perspective views of an example HMD, such as, for example, the HMD 100 worn by the user in FIG. 1. FIG. 8 is a block diagram of an augmented reality and/or virtual reality system including a first electronic device in communication with a second electronic device. The first electronic device 300 may be, for example an HMD generating an augmented and/or virtual reality environment, and the second electronic device 302 may be, for example, a controller including the capabilities of gyromouse as discussed above.

As shown in FIGS. 7A and 7B, the example HMD may include a housing 110 coupled to a frame 120, with an audio output device 130 including, for example, speakers mounted in headphones, coupled to the frame 120. In FIG. 7B, a front portion 110a of the housing 110 is rotated away from a base portion 110b of the housing 110 so that some of the components received in the housing 110 are visible. A display 140 may be mounted on an interior facing side of the front portion 110a of the housing 110. Lenses 150 may be mounted in the housing 110, between the user's eyes and the display 140 when the front portion 110a is in the closed position against the base portion 110b of the housing 110. In some implementations, the HMD 100 may include a sensing system 160 including various sensors such as, for example, audio sensor(s), image/light sensor(s), positional sensors (e.g., inertial measurement unit including gyroscope and accelerometer), and the like. The HMD 100 may also include a control system 170 including a processor 190 and various control system devices to facilitate operation of the HMD 100.

In some implementations, the HMD 100 may include a camera 180 to capture still and moving images. The images captured by the camera 180 may be used to help track a physical position of the user and/or the controller 102, and/or may be displayed to the user on the display 140 in a pass through mode. In some implementations, the HMD 100 may include a gaze tracking device 165 including one or more image sensors 165A to detect and track an eye gaze of the user. In some implementations, the HMD 100 may be configured so that the detected gaze is processed as a user input to be translated into a corresponding interaction in the augmented reality and/or virtual reality environment.

As shown in FIG. 8, the first electronic device 300 may include a sensing system 370 and a control system 380, which may be similar to the sensing system 160 and the control system 170, respectively, shown in FIGS. 7A and 7B. The sensing system 370 may include, for example, a light sensor, an audio sensor, an image sensor, a distance/proximity sensor, a positional sensor, and/or other sensors and/or different combination(s) of sensors, including, for example, an image sensor positioned to detect and track the user's eye gaze. The control system 380 may include, for example, a power/pause control device, audio and video control devices, an optical control device, a transition control device, and/or other such devices and/or different combination(s) of devices. The sensing system 370 and/or the control system 380 may include more, or fewer, devices, depending on a particular implementation, and may have a different physical arrangement that shown. The first electronic device 300 may also include a processor 390 in communication with the sensing system 370 and the control system 380, a memory 385, and a communication module 395 providing for communication between the first electronic device 300 and another, external device, such as, for example, the second electronic device 302.

The second electronic device 302 may include a communication module 306 providing for communication between the second electronic device 302 and another, external device, such as, for example, the first electronic device 300. The second electronic device 302 may include a sensing system 304 including an image sensor and an audio sensor, such as is included in, for example, a camera and microphone, an inertial measurement unit, a touch sensor such as is included in a touch sensitive surface of a controller, or smartphone, and other such sensors and/or different combination(s) of sensors. A processor 309 may be in communication with the sensing system 304 and a control unit 305 of the second electronic device 302, the control unit 305 having access to a memory 308 and controlling overall operation of the second electronic device 302.

Figure 9:
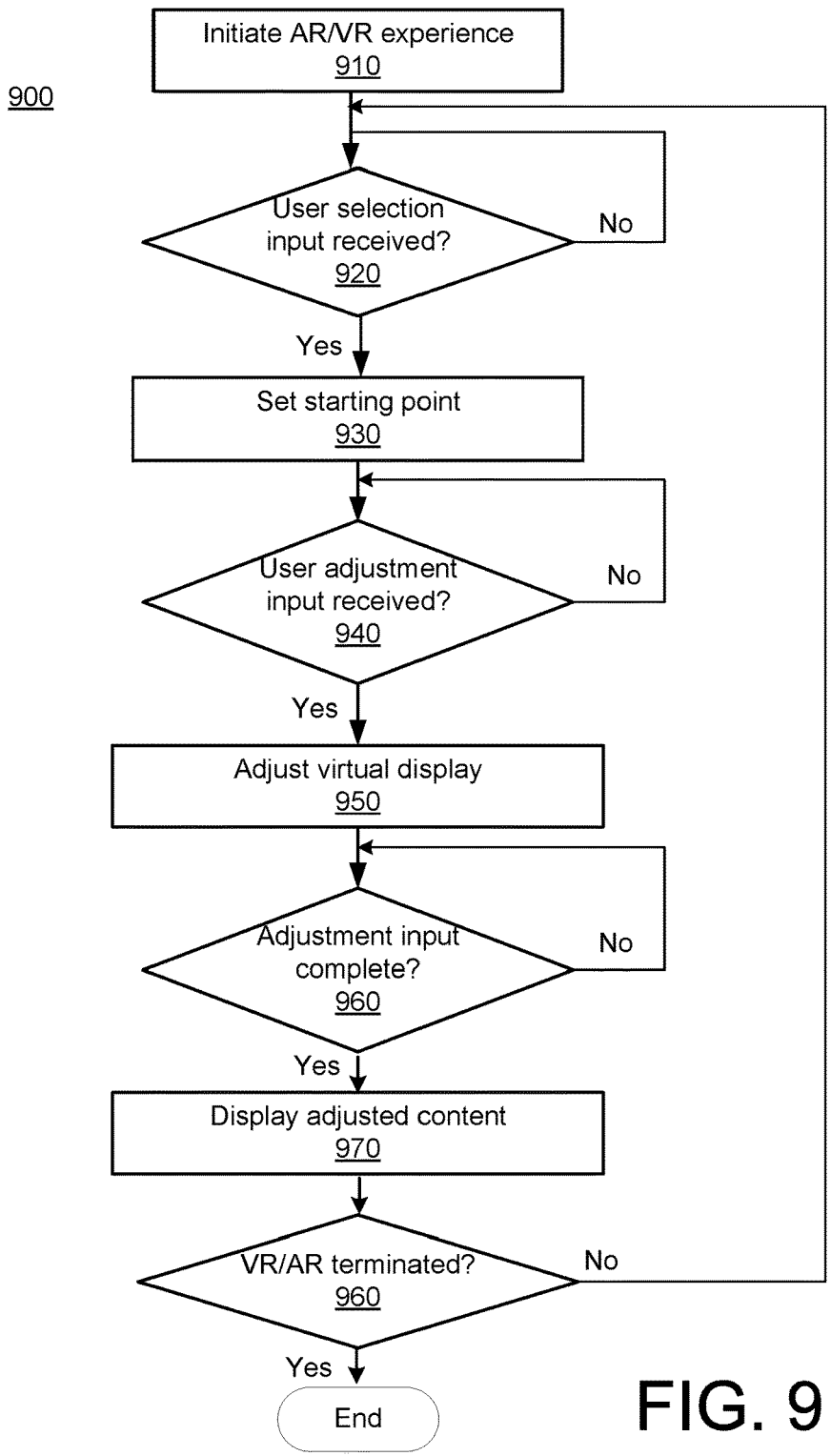
FIG. 9 is a flowchart of a method in accordance with implementations as described herein.

A method 900 of combining gyromouse input and touch input in an augmented reality environment and/or a virtual reality environment, in accordance with implementations described herein, is shown in FIG. 9.

After initiating a virtual and/or augmented reality experience (block 910), a starting point may be set in response to a received user input indicating a selected starting point (blocks 920, 930). This may be, for example, the detection by the system of a virtual beam directed at a particular portion of the virtual display as shown in FIGS. 3A, 4A, 5A, 5C, 5E and 5G. Selected features, items and the like may then be moved, scrolled, scaled and the like in response to a detected user adjustment input (blocks 940, 950), and displayed to the user in the virtual environment in response to termination of the detected user adjustment input (blocks 960, 970). This adjustment, or moving, or scaling and the like, may be done, for example, as discussed in detail above with respect to FIGS. 3B, 4B, 5B, 5D, 5F and 5H. The process may continue until the virtual experience is terminated (block 980).

Figure 10:
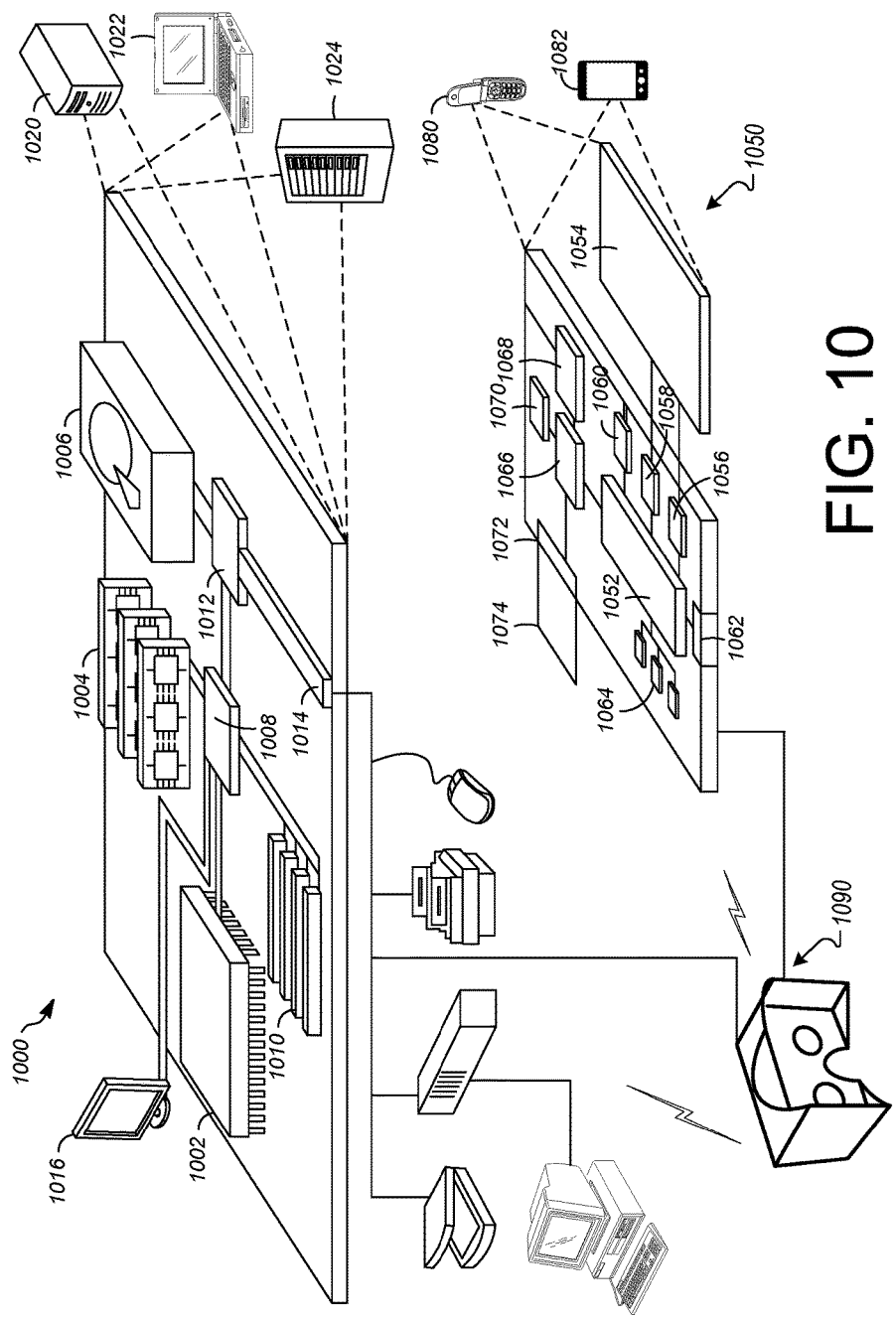
FIG. 10 shows an example of a computer device and a mobile computer device that can be used to implement the techniques described herein.

FIG. 10 shows an example of a computer device 1000 and a mobile computer device 1050, which may be used with the techniques described here. Computing device 1000 includes a processor 1002, memory 1004, a storage device 1006, a high-speed interface 1008 connecting to memory 1004 and high-speed expansion ports 1010, and a low speed interface 1012 connecting to low speed bus 1014 and storage device 1006. Each of the components 1002, 1004, 1006, 1008, 1010, and 1012, are interconnected using various busses, and may be mounted on a common motherboard or in other manners as appropriate. The processor 1002 can process instructions for execution within the computing device 1000, including instructions stored in the memory 1004 or on the storage device 1006 to display graphical information for a GUI on an external input/output device, such as display 1016 coupled to high speed interface 1008. In other implementations, multiple processors and/or multiple buses may be used, as appropriate, along with multiple memories and types of memory. Also, multiple computing devices 1000 may be connected, with each device providing portions of the necessary operations (e.g., as a server bank, a group of blade servers, or a multi-processor system).

The memory 1004 stores information within the computing device 1000. In one implementation, the memory 1004 is a volatile memory unit or units. In another implementation, the memory 1004 is a non-volatile memory unit or units. The memory 1004 may also be another form of computer-readable medium, such as a magnetic or optical disk.

The storage device 1006 is capable of providing mass storage for the computing device 1000. In one implementation, the storage device 1006 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1004, the storage device 1006, or memory on processor 1002.

The high speed controller 1008 manages bandwidth-intensive operations for the computing device 1000, while the low speed controller 1012 manages lower bandwidth-intensive operations. Such allocation of functions is exemplary only. In one implementation, the high-speed controller 1008 is coupled to memory 1004, display 1016 (e.g., through a graphics processor or accelerator), and to high-speed expansion ports 1010, which may accept various expansion cards (not shown). In the implementation, low-speed controller 1012 is coupled to storage device 1006 and low-speed expansion port 1014. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1000 may be implemented in a number of different forms, as shown in the figure. For example, it may be implemented as a standard server 1020, or multiple times in a group of such servers. It may also be implemented as part of a rack server system 1024. In addition, it may be implemented in a personal computer such as a laptop computer 1022. Alternatively, components from computing device 1000 may be combined with other components in a mobile device (not shown), such as device 1050. Each of such devices may contain one or more of computing device 1000, 1050, and an entire system may be made up of multiple computing devices 1000, 1050 communicating with each other.

Computing device 1050 includes a processor 1052, memory 1064, an input/output device such as a display 1054, a communication interface 1066, and a transceiver 1068, among other components. The device 1050 may also be provided with a storage device, such as a microdrive or other device, to provide additional storage. Each of the components 1050, 1052, 1064, 1054, 1066, and 1068, are interconnected using various buses, and several of the components may be mounted on a common motherboard or in other manners as appropriate.

The processor 1052 can execute instructions within the computing device 1050, including instructions stored in the memory 1064. The processor may be implemented as a chipset of chips that include separate and multiple analog and digital processors. The processor may provide, for example, for coordination of the other components of the device 1050, such as control of user interfaces, applications run by device 1050, and wireless communication by device 1050.

Processor 1052 may communicate with a user through control interface 1058 and display interface 1056 coupled to a display 1054. The display 1054 may be, for example, a TFT LCD (Thin-Film-Transistor Liquid Crystal Display) or an OLED (Organic Light Emitting Diode) display, or other appropriate display technology. The display interface 1056 may comprise appropriate circuitry for driving the display 1054 to present graphical and other information to a user. The control interface 1058 may receive commands from a user and convert them for submission to the processor 1052. In addition, an external interface 1062 may be provide in communication with processor 1052, so as to enable near area communication of device 1050 with other devices. External interface 1062 may provide, for example, for wired communication in some implementations, or for wireless communication in other implementations, and multiple interfaces may also be used.

The memory 1064 stores information within the computing device 1050. The memory 1064 can be implemented as one or more of a computer-readable medium or media, a volatile memory unit or units, or a non-volatile memory unit or units. Expansion memory 1074 may also be provided and connected to device 1050 through expansion interface 1072, which may include, for example, a SIMM (Single In Line Memory Module) card interface. Such expansion memory 1074 may provide extra storage space for device 1050, or may also store applications or other information for device 1050. Specifically, expansion memory 1074 may include instructions to carry out or supplement the processes described above, and may include secure information also. Thus, for example, expansion memory 1074 may be provide as a security module for device 1050, and may be programmed with instructions that permit secure use of device 1050. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1064, expansion memory 1074, or memory on processor 1052, that may be received, for example, over transceiver 1068 or external interface 1062.

Device 1050 may communicate wirelessly through communication interface 1066, which may include digital signal processing circuitry where necessary. Communication interface 1066 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1068. In addition, short-range communication may occur, such as using a Bluetooth, Wi-Fi, or other such transceiver (not shown). In addition, GPS (Global Positioning System) receiver module 1070 may provide additional navigation- and location-related wireless data to device 1050, which may be used as appropriate by applications running on device 1050.

Device 1050 may also communicate audibly using audio codec 1060, which may receive spoken information from a user and convert it to usable digital information. Audio codec 1060 may likewise generate audible sound for a user, such as through a speaker, e.g., in a handset of device 1050. Such sound may include sound from voice telephone calls, may include recorded sound (e.g., voice messages, music files, etc.) and may also include sound generated by applications operating on device 1050.

The computing device 1050 may be implemented in a number of different forms, as shown in the figure. For example, it may be implemented as a cellular telephone 1080. It may also be implemented as part of a smart phone 1082, personal digital assistant, or other similar mobile device.

Various implementations of the systems and techniques described here can be reali10ed in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In some implementations, the computing devices depicted in FIG. 10 can include sensors that interface with a virtual reality (VR headset/HMD device 1090). For example, one or more sensors included on a computing device 1050 or other computing device depicted in FIG. 10, can provide input to VR headset 1090 or in general, provide input to a VR space. The sensors can include, but are not limited to, a touchscreen, accelerometers, gyroscopes, pressure sensors, biometric sensors, temperature sensors, humidity sensors, and ambient light sensors. The computing device 1050 can use the sensors to determine an absolute position and/or a detected rotation of the computing device in the VR space that can then be used as input to the VR space. For example, the computing device 1050 may be incorporated into the VR space as a virtual object, such as a controller, a laser pointer, a keyboard, a weapon, etc. Positioning of the computing device/virtual object by the user when incorporated into the VR space can allow the user to position the computing device so as to view the virtual object in certain manners in the VR space. For example, if the virtual object represents a laser pointer, the user can manipulate the computing device as if it were an actual laser pointer. The user can move the computing device left and right, up and down, in a circle, etc., and use the device in a similar fashion to using a laser pointer.

In some implementations, one or more input devices included on, or connect to, the computing device 1050 can be used as input to the VR space. The input devices can include, but are not limited to, a touchscreen, a keyboard, one or more buttons, a trackpad, a touchpad, a pointing device, a mouse, a trackball, a joystick, a camera, a microphone, earphones or buds with input functionality, a gaming controller, or other connectable input device. A user interacting with an input device included on the computing device 1050 when the computing device is incorporated into the VR space can cause a particular action to occur in the VR space.

In some implementations, a touchscreen of the computing device 1050 can be rendered as a touchpad in VR space. A user can interact with the touchscreen of the computing device 1050. The interactions are rendered, in VR headset 1090 for example, as movements on the rendered touchpad in the VR space. The rendered movements can control virtual objects in the VR space.

In some implementations, one or more output devices included on the computing device 1050 can provide output and/or feedback to a user of the VR headset 1090 in the VR space. The output and feedback can be visual, tactical, or audio. The output and/or feedback can include, but is not limited to, vibrations, turning on and off or blinking and/or flashing of one or more lights or strobes, sounding an alarm, playing a chime, playing a song, and playing of an audio file. The output devices can include, but are not limited to, vibration motors, vibration coils, pie10oelectric devices, electrostatic devices, light emitting diodes (LEDs), strobes, and speakers.

In some implementations, the computing device 1050 may appear as another object in a computer-generated, 3D environment. Interactions by the user with the computing device 1050 (e.g., rotating, shaking, touching a touchscreen, swiping a finger across a touch screen) can be interpreted as interactions with the object in the VR space. In the example of the laser pointer in a VR space, the computing device 1050 appears as a virtual laser pointer in the computer-generated, 3D environment. As the user manipulates the computing device 1050, the user in the VR space sees movement of the laser pointer. The user receives feedback from interactions with the computing device 1050 in the VR environment on the computing device 1050 or on the VR headset 1090.

In some implementations, a computing device 1050 may include a touchscreen. For example, a user can interact with the touchscreen in a particular manner that can mimic what happens on the touchscreen with what happens in the VR space. For example, a user may use a pinching-type motion to 10oom content displayed on the touchscreen. This pinching-type motion on the touchscreen can cause information provided in the VR space to be 10oomed. In another example, the computing device may be rendered as a virtual book in a computer-generated, 3D environment. In the VR space, the pages of the book can be displayed in the VR space and the swiping of a finger of the user across the touchscreen can be interpreted as turning/flipping a page of the virtual book. As each page is turned/flipped, in addition to seeing the page contents change, the user may be provided with audio feedback, such as the sound of the turning of a page in a book.

In some implementations, one or more input devices in addition to the computing device (e.g., a mouse, a keyboard) can be rendered in a computer-generated, 3D environment. The rendered input devices (e.g., the rendered mouse, the rendered keyboard) can be used as rendered in the VR space to control objects in the VR space.

Computing device 1000 is intended to represent various forms of digital computers and devices, including, but not limited to laptops, desktops, workstations, personal digital assistants, servers, blade servers, mainframes, and other appropriate computers. Computing device 1050 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

A number of embodiments have been described. Nevertheless, it will be understood that various modifications may be made without departing from the spirit and scope of the specification.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A method, comprising:
   generating, in a head mounted display device operating in an ambient environment, a virtual environment;
   setting an anchor point in a virtual display of a virtual object displayed in the virtual environment in response to a selection input received from a handheld controller that is operably coupled to the head mounted display device;
   receiving, from the controller, a first input implementing a first input mode of the handheld controller;
   adjusting an arrangement of a plurality of virtual features associated with the virtual display of the virtual object in response to the first input, a virtual display area of the virtual display being less than a display area needed to display all of the plurality of virtual features simultaneously;
   receiving, from the handheld controller, a second input implementing a second input mode of the handheld controller, the second input mode being different than the first input mode; and
   executing a response to the second input from the handheld controller, based on a set of previously defined rules, including:
      ignoring the second input in response to a determination that the second input includes a detected physical movement of the handheld controller that is inside a previously defined range; and
      executing an action in the virtual environment in response to a determination that the second input includes a detected physical movement of the handheld controller that is outside of the previously defined range.

2. The method of claim 1, setting the anchor point in the virtual display of the virtual object in response to the selection input received from the controller including:
   detecting an intersection point of a virtual beam directed from the controller with a portion of the virtual display; and
   setting the anchor point at the detected intersection point in response to the selection input, the selection input including a detected activation of a manipulation device of the controller.

3. The method of claim 1, wherein the first input mode is a touch input on the touch surface of the controller, and the second input mode is a physical movement of the controller, and wherein the selection input is detected in response to an activation of a manipulation device of the controller.

4. The method of claim 3, adjusting the arrangement of the plurality of virtual features associated with the virtual display of the virtual object in response to the first input including:

moving through the plurality of virtual features, including:
  sequentially scrolling through the plurality of virtual features, in a direction corresponding to the first input in response to a determination that the first input corresponds to a selection of a scrolling button of the virtual display; and
  jumping to one or more virtual features, of the plurality of virtual features in response to a determination that the first input corresponds to a selection of a virtual content button, the virtual content button corresponding to a set point in a sequential listing of the plurality of virtual features; and
  displaying a combination of virtual features, of the plurality of virtual features, on the virtual display of the virtual object, the displayed combination of virtual features being different from a combination of virtual features, of the plurality of virtual features, displayed before the moving.

5. The method of claim 3, setting the anchor point in the virtual display of the virtual object in response to the selection input received from the controller including:
  detecting an intersection point of a virtual beam directed from the controller with one of a plurality of vertical scroll arrows positioned in a vertical scroll bar of the virtual display, or with one of a plurality of horizontal scroll arrows positioned in a horizontal scroll bar of the virtual display, or within a designated area of the vertical scroll bar, or within a designated area of the horizontal scroll bar;
  setting the anchor point corresponding to the detected intersection point; and
  scrolling through the plurality of virtual features associated with the virtual display in response to a touch input on the touch surface of the controller, the scrolling progressing in a direction corresponding to the anchor point and the touch input.

6. The method of claim 5, scrolling through the plurality of virtual features including:
  sequentially scrolling through the plurality of virtual features in response to the touch input;
  maintaining the scrolling while the touch input on the touch surface of the controller is maintained; and
  terminating the scrolling when a release of the touch on the touch surface of the controller is detected.

7. The method of claim 5, the touch input on the touch surface of the controller being a series of tap inputs on the touch surface of the controller, the scrolling through the plurality of virtual features including sequentially scrolling, by a defined amount, through the plurality of virtual features in response to each tap input detected on the touch surface.

8. The method of claim 3, setting the anchor point in the virtual display in response to the selection input received from the controller including:
  detecting an intersection point of a virtual beam directed from the controller with one of a plurality of portions of the virtual display, plurality of portions of the virtual display including a top portion of the virtual display, a bottom portion of the virtual display, a left portion of the virtual display, a right portion of the virtual display, a vertical movement bar positioned in a vertical scroll bar of the virtual display, and a horizontal movement bar positioned in a horizontal scroll bar of the virtual display, and setting the anchor point at the detected intersection point in response to a touch input on the touch surface of the controller;
  scrolling through the plurality of virtual features associated with the virtual object in response to a drag input on the touch surface, the plurality of virtual features displayed on the virtual display scrolling from the anchor point in a direction corresponding to a direction of the drag input on the touch surface of the controller; and
  terminating the scrolling in response to a detected release of the touch and drag input on the touch surface of the controller.

9. The method of claim 3, wherein adjusting the arrangement of the plurality of virtual features associated with the virtual display of the virtual object in response to the first input includes scrolling through the plurality of virtual features associated with the virtual display of the virtual object in response to the first input, in a direction corresponding to the touch input on the touch surface of the controller, such that different combinations of virtual features of the plurality of virtual features are displayed in response to the scrolling.

10. The method of claim 9, scrolling through the plurality of virtual features in response to the first input also including:
  detecting a release of the activation of the manipulation device of the controller; and
  terminating the scrolling of the plurality of virtual features in response to the detected release.

11. The method of claim 1, wherein the first input mode is a physical movement of the controller, and the second input mode is a touch input on a touch surface of the controller, and wherein the selection input is detected in response to an activation of a manipulation device of the controller.

12. The method of claim 11, adjusting the arrangement of the plurality virtual objects associated with the virtual display of the virtual object in response to the first input including:
  scrolling through the plurality of virtual features associated with the virtual display of the virtual object in response to the first input, in a direction corresponding to the touch input on the touch surface of the controller, such that different combinations of virtual features of the plurality of virtual features are displayed in response to the scrolling;
  detecting a release of the activation of the manipulation device of the controller; and
  terminating the scrolling of the plurality of virtual objects in response to the detected release.

13. A computing device, comprising:
  a memory storing executable instructions; and
  a processor configured to execute the instructions, to cause the computing device to:
    display a virtual environment on a display of a head mounted electronic device worn by a user and operating in an ambient environment;
    set an anchor point in a virtual display of a virtual object displayed in the virtual environment in response to detecting selection input received from a handheld controller that is operably coupled to the head mounted electronic device;
    receive, from the handheld controller, a first input implementing a first input mode;
    adjust an arrangement of a plurality of virtual features associated with the virtual display of the virtual object in response to the first input, a virtual display area of the virtual display being less than a display area needed to display all of the plurality of virtual features simultaneously;

receive, from the handheld controller, a second input implementing a second input mode, the second input mode being different than the first input mode; and execute a response to the second input based on a set of previously defined rules, including:

ignore the second input in response to a determination that the second input includes a detected touch input on a touch surface of the handheld controller that is inside a previously defined area of the touch surface of the handheld controller; and execute an action in the virtual environment in response to a determination that the second input includes a touch on the touch surface of the handheld controller that is outside of the previously defined area of the touch surface of the handheld controller.

14. The computing device of claim 13, wherein the first input mode is a touch input on a touch surface of the controller, and the second input mode is a physical movement of the controller, and wherein, in setting the anchor point, the instructions cause the computing device to:

detect an intersection point of a virtual beam directed from the controller with a portion of the virtual display; and set the anchor point at the detected intersection point in response to the selection input, the selection input being detected in response to a detected activation of a manipulation device of the controller.

15. The computing device of claim 14, wherein, in adjusting the plurality of virtual features associated with the virtual display of the virtual object in response to the first input, the instructions cause the computing device to:

move through the plurality of virtual features associated with the virtual display of the virtual object in response to the first input, in a direction corresponding to the touch input on the touch surface of the controller, such that different combinations of virtual features of the plurality of virtual features are displayed in response to the movement of the plurality of virtual features.

16. The computing device of claim 15, wherein, in moving through the plurality of virtual features, the instructions cause the computing device to:

sequentially scroll through the plurality of virtual features associated with the virtual display of the virtual object, in the direction corresponding to the touch input on the touch surface of the controller, the touch input;

terminate the scrolling in response to a detected release of the touch input on the touch surface of the controller; and display a combination of virtual features, of the plurality of virtual features, on the virtual display of the virtual object, the displayed combination of virtual features being different from a combination of virtual features, of the plurality of virtual features, displayed before the scrolling.

17. The computing device of claim 15, wherein, in moving through the plurality of virtual features, the instructions cause the computing device to:

jump to one or more virtual features, of the plurality of virtual features, corresponding to the first input, the first input corresponding to a selection of a virtual content button, the virtual content button corresponding to a set point in a sequential listing of the plurality of virtual features; and display a combination of virtual features, of the plurality of virtual features, on the virtual display of the virtual object, the displayed combination of virtual features being different from a combination of virtual features, of the plurality of virtual features, displayed before the jump.

18. A method, comprising:

generating, in a head mounted display device operating in an ambient environment, a virtual environment;

setting an anchor point in a virtual display of a virtual object displayed in the virtual environment in response to a selection input received from a handheld controller that is operably coupled to the head mounted display device;

receiving, from the controller, a first input implementing a first input mode of the handheld controller;

adjusting an arrangement of a plurality of virtual features associated with the virtual display of the virtual object in response to the first input, a virtual display area of the virtual display being less than a display area needed to display all of the plurality of virtual features simultaneously;

receiving, from the handheld controller, a second input implementing a second input mode of the handheld controller, the second input mode being different than the first input mode; and executing a response to the second input from the handheld controller, based on a set of previously defined rules, including:

executing an action in the virtual environment corresponding to the second input in response to a determination that the second input includes a detected touch input on a touch surface of the handheld controller that is outside of a previously defined area of the touch surface of the handheld controller; and ignoring the second input in response to a determination that the second input includes a detected input on the touch surface of the handheld controller that is inside the previously defined area of the touch surface of the handheld controller.

19. The method of claim 1, wherein executing the response to the second input from the handheld controller, based on the set of previously defined rules, also includes:

executing an action in the virtual environment corresponding to the second input in response to a determination that the second input includes a detected touch input on a touch surface of the handheld controller that is outside of a previously defined area of the touch surface of the handheld controller; and ignoring the second input in response to a determination that the second input includes a detected input on the touch surface of the handheld controller that is inside of the previously defined area of the touch surface of the handheld controller.

* * * * *